United States Patent

[11] 3,630,584

| [72] | Inventor | Lewis W. McKee |
| | | Brookfield, Conn. |
| [21] | Appl. No. | 260 |
| [22] | Filed | Jan. 2, 1970 |
| [45] | Patented | Dec. 28, 1971 |
| [73] | Assignee | The Bayden Corporation |
| | | Danbury, Conn. |

[54] LUBRICATED BALL BEARING HAVING LONG FATIGUE LIFE
11 Claims, 6 Drawing Figs.

[52] U.S. Cl. .................................................. 308/187
[51] Int. Cl. .................................................. F16c 1/24
[50] Field of Search .................................... 308/187, 216, 211, 122

[56] References Cited
UNITED STATES PATENTS

| 2,244,197 | 6/1941 | Hessler ........................ | 308/216 |
| 2,528,987 | 11/1950 | Ablett .......................... | 308/216 |
| 3,110,085 | 11/1963 | Sternlicht ..................... | 308/122 |
| 3,304,138 | 2/1967 | Sampatacos .................. | 308/195 |

*Primary Examiner*—Martin P. Schwadron
*Assistant Examiner*—Frank Susko
*Attorney*—Shenier and O'Connor

ABSTRACT: A bearing assembly in which porous lubricant retaining inner and outer rings receive raceway-providing inserts formed from sheet steel alloy bonded in place in recesses in the rings.

PATENTED DEC 28 1971
3,630,584
SHEET 1 OF 2
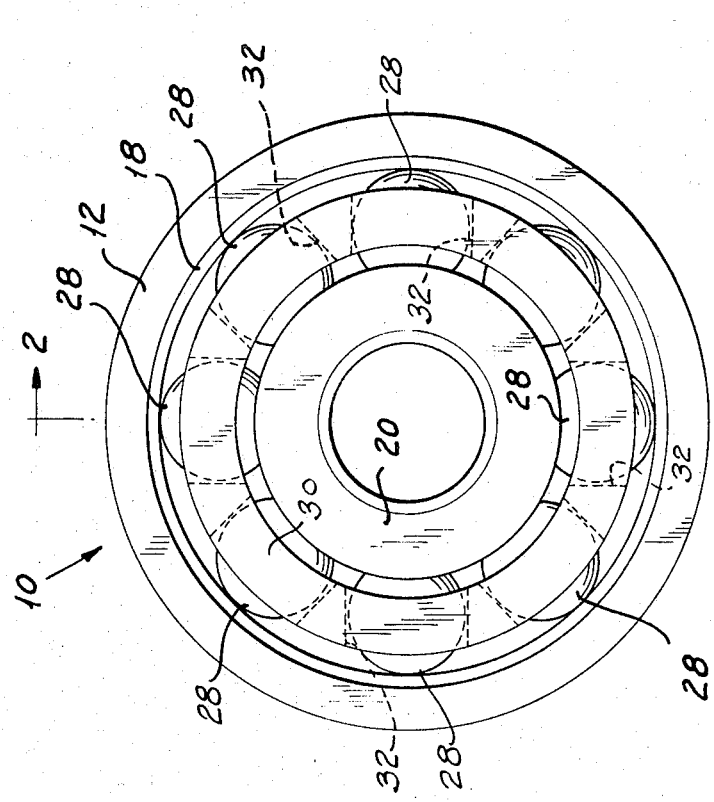
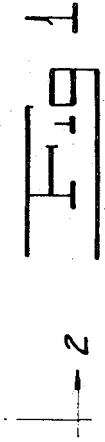
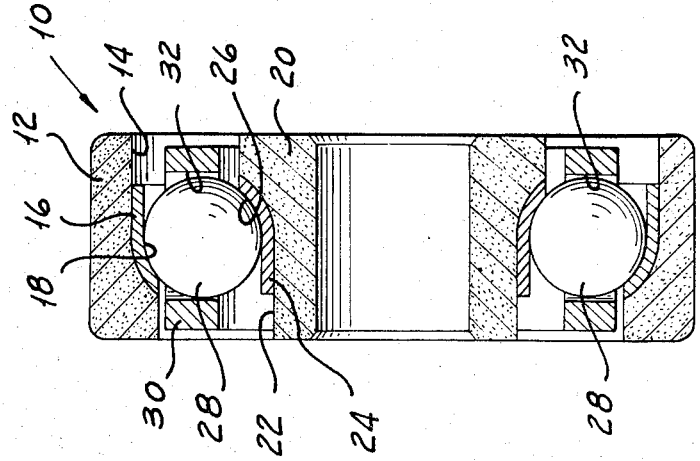
INVENTOR
Lewis W. McKee
Shenier & O'Connor
ATTORNEYS

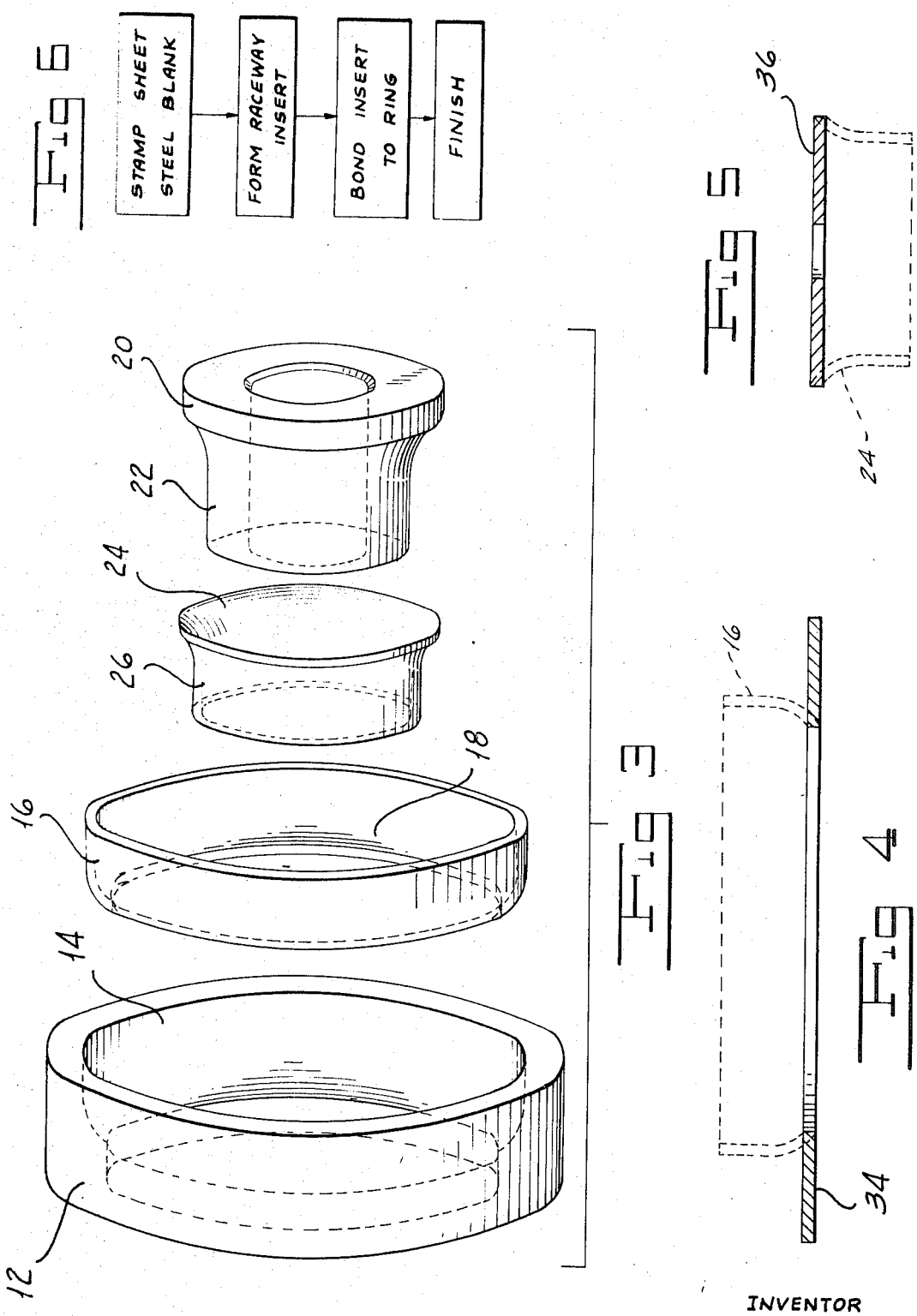

3,630,584

LUBRICATED BALL BEARING HAVING LONG FATIGUE LIFE

BACKGROUND OF THE INVENTION

Many forms of bearings such for example as angular contact and deep groove ball bearings, thrust bearings, tapered and cylindrical roller bearings, multiple row bearings and others are known in the prior art. All of these bearings have in common the problem of a limited fatigue life. It is, of course, desirable that the fatigue life of such bearings be extended to as long a period as is possible consistent with economic consideration. It is further desirable in many instances that such bearings be self-lubricated without detracting from the fatigue life of the bearing.

Various relatively complicated and expensive expedients have been proposed in the prior art for improving the fatigue life of bearings. For example, it has been suggested that layers of relatively exotic materials be applied to the raceways by complicated and expensive processes in order to extend the life of the bearing or to permit it to serve under relatively extreme conditions of use as for example, high temperatures or corrosive conditions or the like.

There are further known in the prior art self-lubricated bearings in which the rings providing the raceways are formed from porous materials so as to receive and contain lubricant which is permitted to flow through the bores to the raceways. While such arrangements successfully solve the problem of providing a self-lubricating raceway, the material of which such bearings are formed have a relatively short fatigue life.

I have invented a rolling bearing assembly having both a superior fatigue life and a lubricant reservoir. My bearing provides a relatively long fatigue life as contrasted with conventional bearings. It is simple in construction as compared with long life bearings of the prior art. My bearing provides a long life for the raceway while reducing stress throughout the ring carrying the raceway. I have provided a simple, expeditious and inexpensive method for making a rolling bearing having a long fatigue life.

Summary of the Invention

One object of my invention is to provide a rolling bearing assembly having a longer fatigue life than do conventional bearings.

Another object of my invention is to provide a rolling bearing assembly combining superior fatigue life with a lubricant reservoir.

A further object of my invention is to provide a rolling bearing assembly having a long fatigue life which is simpler and less expensive to construct than are long life bearings of the prior art.

A still further object of my invention is to provide a method for making a rolling bearing assembly having a long life which is simple, expeditious and inexpensive to perform.

Other and further objects of my invention will appear from the following description.

In general my invention contemplates the provision of a self-lubricated rolling bearing assembly having a long life in which I form inner and outer raceway inserts from sheet steel alloy with the grain of the metal parallel to the raceways for assembly of the inserts respectively in recesses in inner and outer rings formed from powdered metal so as to provide porous bodies for receiving lubricant. I bond the inserts in place by sintering or the like. When that operation has been performed, suitable finishing operations may be carried out.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is an end elevation of one form of my lubricated ball bearing assembly having a long fatigue life.

FIG. 2 is a sectional view of the assembly illustrated in FIG. 1 taken along the line 2—2 of FIG. 1.

FIG. 3 is an exploded perspective view of the inner and outer rings of the bearing assembly illustrated in FIG. 1.

FIG. 4 is an elevation of a blank from which I may form the outer ring raceway insert of my bearing assembly.

FIG. 5 is an elevation of a blank from which I may form the inner ring raceway insert of my bearing assembly. FIG. 6 is a schematic view illustrating the steps carried out in making my bearing assembly.

DESCRIPTION OF THE PREFERRED EMBODIMENT

Referring now to the drawings I have shown one form of my rolling bearing assembly, indicated generally by the reference character 10, having a long fatigue life and provided with a lubricant reservoir. By way of example I have shown an assembly 10 of the angular contact type. As will be apparent from the description hereinbelow my invention is equally applicable to other types of rolling bearing assemblies.

The assembly 10 includes an outer ring 12 which, preferably, I form from powdered metal to provide a porous structure for receiving a suitable lubricant. Ring 12 is formed with a recess 14 which is open at one end of the ring and which is provided with a shoulder at the other end thereof. As will be explained more fully hereinbelow, recess 14 receives an insert 16 formed from sheet metal such, for example, as a sheet steel alloy. I bond the insert 16 in the recess 14 and shape it to provide an angular contact raceway 18.

I also form the inner ring 20 of the assembly 10 from powdered metal or the like to provide a porous structure for receiving a lubricant. Ring 20 is formed with a recess 22 in its outer surface with the recess 22 being open at one end of the ring and having shoulder at the other end thereof. I form an inner raceway providing insert 24 from a sheet steel alloy for example and bond it in position in the recess 22 in a manner to be described hereinbelow.

In the completed assembly 10 balls 28 disposed in pockets 32 in a ball cage 30 of any suitable type known to the art are positioned between rings 12 and 20 and in contact with the raceways 18 and 26.

In making my bearing assembly 10 I first form the rings 12 and 20 from powdered metal so as to provide porous structures for receiving lubricant. Rings 12 and 20 respectively are provided with a recess 14 and with a recess 22 for receiving the raceway forming inserts 16 and 24. In forming the insert 16 I first cut an annular blank 34 from a suitable material such as a sheet steel alloy. After cutting the blank I draw or otherwise shape it to the form desired for the insert 16. The shape of the blank 34 after such formation is indicated by the broken lines in FIG. 4. Beginning with a blank 36 shown in FIG. 5 cut from sheet steel alloy I then shape the blank to form the insert 24 the final outline configuration of which is indicated by the broken lines in FIG. 5.

Having formed the two inserts 16 and 24 in the manner just described I next press or insert them respectively into the recess 14 in ring 12 and into the recess 22 in ring 20 and sinter the two assemblies so as firmly to bond the inserts to the rings. Once the two ring assemblies have been put together in the manner described, suitable finishing operations may be performed. The ring assemblies may be heat treated, the external surface may be machined or ground as desired, and the raceways may be finish ground all to desired dimensions and tolerances. Following the finishing operations the balls 28 in cage 30 may be assembled with the ring structures to complete the bearing.

My formation of the raceway from sheet stock ensures that the grain of the material of the raceway is parallel to the surface of the raceway. It is known in the art that grain direction parallel to a surface provides longer fatigue life than that which is possible when the grain runs in a direction perpendicular to the wearing surface. Moreover, the formation of the inserts requires working of the material further to refine it and to improve its fatigue characteristic. The combination of the softer powdered metal backing body with the formed sheet steel insert results in a lower stress throughout the ring structure.

It is to be understood that the rings 12 and 20 of the assembly may be impregnated with any suitable liquid lubricant in a manner known to the art. In use of the bearing the lubricant migrates out of the pores in the surfaces of the rings carrying the inserts and up into the raceways where it is picked up by the balls. It may, of course, be satisfactory to impregnate only one of the rings.

As has been pointed out hereinabove, while I have shown a bearing assembly 10 of the angular contact type my invention is equally applicable to other types of bearings. In applying the method to other types of bearings minor variations in the technique of forming the insert and of assembling the parts of the bearing may be necessary. For example, in making a deep groove bearing it may be necessary to form each of the rings in two halves and then assemble them by sintering or the like.

It will be seen that I have accomplished the objects of my invention. I have provided a bearing assembly having a very long fatigue life as compared with conventional bearing assemblies of the prior art. My assembly is considerably simpler than are bearings of the prior art intended to have a long fatigue life. My assemblies combines the features of providing a long life and a lubricant reservoir. It is relatively simple and inexpensive to manufacture.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a rolling bearing, an assembly including a ring of porous lubricant retaining material formed with a recess, an annular sheet metal insert formed to provide a raceway and means for bonding said insert in said recess.

2. An assembly as in claim 1 in which said insert is from sheet steel having a grain generally parallel to said raceway.

3. An assembly as in claim 1 in which said ring is formed of powdered metal.

4. An assembly as in claim 1 in which said insert is sintered in said recess.

5. An assembly as in claim 1 in which said ring is formed from powdered metal and in which said insert is sintered with said ring to bond the insert thereto.

6. A rolling bearing assembly including in combination, an outer ring of porous lubricant retaining material formed with an internal recess, a first annular sheet metal insert formed to provide an outer raceway, means for bonding said first insert in the recess of said outer ring, an inner ring of porous lubricant retaining material formed with an external recess, a second annular sheet metal insert formed to provide an inner raceway and means for bonding said second insert in the recess of said inner ring, and rolling elements disposed between said rings in said recesses.

7. A rolling bearing assembly as in claim 6 in which each of said inserts is formed from sheet steel with its grain oriented parallel to said raceways.

8. A rolling bearing assembly as in claim 6 in which each of said rings is formed from powdered metal and in which said inserts are sintered to said rings.

9. In a rolling bearing, a ring of porous lubricant retaining material and a ring of sheet metal forming a raceway bonded to said ring.

10. An assembly as in claim 1 in which said insert is narrower than is said ring whereby a portion of said recess remains exposed after said insert is positioned in said recess.

11. In a rolling bearing an assembly including a ring of porous lubricant retaining material, said ring formed with a recess having an annular shoulder at one edge and being open around the other edge, an annular insert of sheet metal formed to provide a raceway, said annular insert having a portion conforming to the portion of said recess adjacent to said shoulder and having another portion with a diameter corresponding to a diameter of said ring at said other edge to permit said insert to be inserted into said recess, and means for retaining said insert in said recess.

* * * * *

PO-1050
(5/69)

UNITED STATES PATENT OFFICE
CERTIFICATE OF CORRECTION

Patent No. 3,630,584            Dated December 28, 1971

Inventor(s) Lewis W. McKee

It is certified that error appears in the above-identified patent and that said Letters Patent are hereby corrected as shown below:

On the title page, the heading [73] should read:

"Assignee     The Barden Corporation"

Signed and sealed this 16th day of May 1972.

(SEAL)
Attest:

EDWARD M. FLETCHER, JR.          ROBERT GOTTSCHALK
Attesting Officer                   Commissioner of Patents